H. W. JONES.
FILLING AND WEIGHING APPARATUS.
APPLICATION FILED APR. 27, 1915.

1,178,727.

Patented Apr. 11, 1916.
5 SHEETS—SHEET 4.

WITNESSES:
Wm. F. Drew
S. Constine

INVENTOR
H. W. Jones
BY
Acker, Totten
ATTORNEYS

UNITED STATES PATENT OFFICE.

HARRY W. JONES, OF SAN FRANCISCO, CALIFORNIA.

FILLING AND WEIGHING APPARATUS.

1,178,727.

Specification of Letters Patent. Patented Apr. 11, 1916.

Application filed April 27, 1915. Serial No. 24,236.

*To all whom it may concern:*

Be it known that I, HARRY W. JONES, a citizen of the United States, residing in the city and county of San Francisco and State of California, have invented certain new and useful Improvements in Filling and Weighing Apparatus, of which the following is a specification.

The hereinafter described invention is designed for the filling of cartons or other containers with dry commodities, such as coffee, spices, tea, and more particularly raisins and those known as seeded raisins, and to accurately weigh the material as delivered into the cartons or containers, the construction and arrangement of the working parts being such that the stream flow of the commodity into the carton or container is automatically cut off or deflected therefrom on the proper quantity as to weight of material for a given size package being delivered therein.

The objects of the invention are to accurately determine the flow of material into a carton or container for the packing therein of a given weight and to automatically cut off the flow of material to such carton or container on the proper weight as to material being secured therein, whereby an underweight as to a filled carton or container is absolutely provided against; to provide for adjustability of the weighing mechanism in order that the same may be varied to adjust the machine for the filling of different size cartons or containers, and to provide a machine inexpensive as to construction, positive and automatic in its operation, and one wherein a plurality of cartons or containers may be filled and weighed alternately.

With the foregoing and other objects in view the invention comprises the association of coöperating means hereinafter set forth and described.

To comprehend the invention, reference should be had to the accompanying sheets of drawings, wherein—

Figure 1:
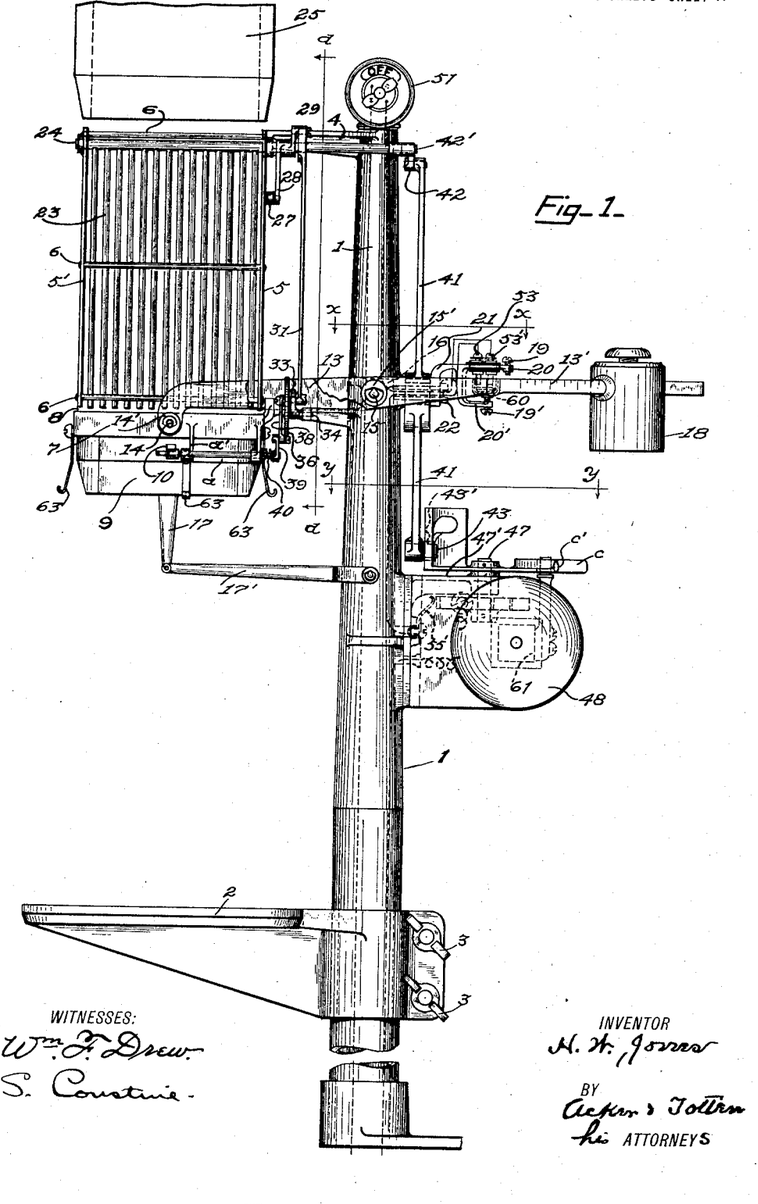
Figure 1 is a side elevation of the improved weighing and filling machine.
Figure 2:
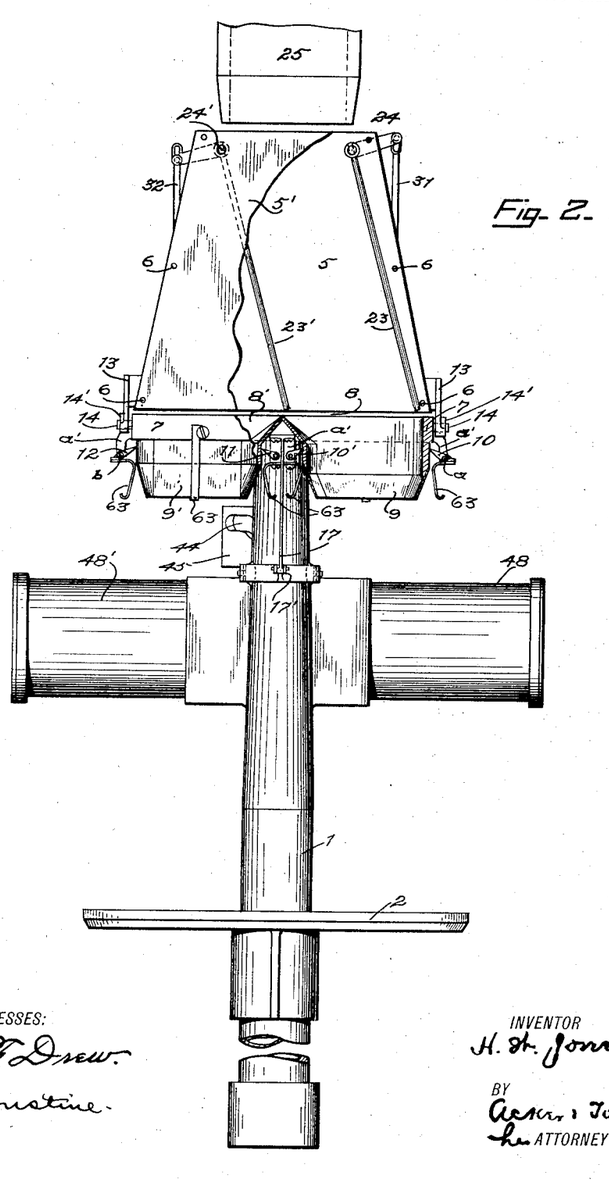
Fig. 2 is a front elevation of the machine, the hopper being partly broken away to illustrate the pivoted or swinging riddles mounted therein for separating or diverting the flowing stream of material from one discharge outlet of the feed hopper to the other discharge outlet thereof.
Figures 3, 4, 5:
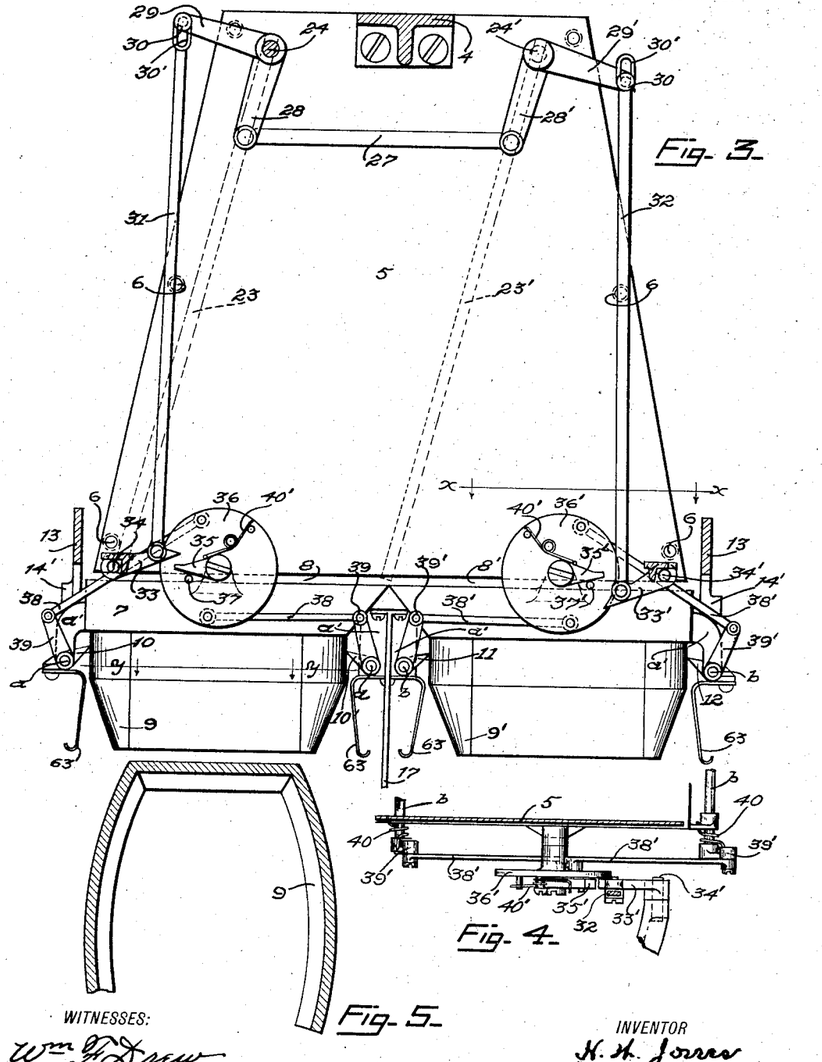
Fig. 3 is a vertical sectional view taken on the line *a—a—* Fig. 1 of the drawing and viewed in the direction of the arrows, illustrating the means for shifting or throwing the pivotal riddles for changing the direction of the stream flow of the material passing therethrough to the respective discharge outlets thereof, also disclosing the devices for guiding and holding the cartons or containers to be filled onto the discharge nozzles for the outlets of the hopper and for releasing the filled container or carton therefrom, said view disclosing the trip rods for actuating the means controlling the spring held dogs for holding the cartons onto the discharge nozzles of the feed hopper.
Fig. 4 is a cross sectional plan view taken on line *x—x—* Fig. 3 of the drawings and viewed in the direction of the arrows, illustrating the means actuated by the trip rods for throwing the spring held dogs which hold the carton or container to the discharge nozzles of the feed hopper.
Fig. 5 is a broken sectional view of one of the discharge nozzles for the outlets of the feed hopper, taken on line *y—y—* Fig. 3 of the drawings and viewed in the direction of the arrows.

In the drawings, reference being had more particularly to Figs. 1, 2 and 3 thereof, the numeral 1 is used to designate any suitable form of standard for supporting the weighing and filling mechanism and 2 is a platform adjustable thereon by means of the set screws 3, the purpose of which platform is either to support the cartons or containers to be filled or to receive the filled ones released from the nozzles of the discharge outlets of the hopper. To the said standard is held by suitable brackets 4 the feed hopper 5 which, in the present case, comprises two plates 5 and 5' held in spaced relation by means of the securing bolts 6. A frame 7 is positioned beneath the hopper and is provided with the outlet or discharge openings 8 and 8', and is movable toward and from the wall plates 5 and 5', and the outlet or discharge openings 8 and 8' of said frame 7 terminate respectively in the downwardly tapered discharge nozzles 9 and 9' and onto said nozzles the cartons or containers to be filled are held by the spring controlled dogs 10 and 10' and 11 and 12, as hereinafter explained,—Fig. 3 of the drawings.

The frame 7 is carried at the forward end of the bifurcated arms 13 of the weight beam 13', being pivoted thereto by the knife edge studs 14 projecting from said frame 7 and extending through knife edge bearings 14' of the arms 13. The said arms 13 in turn are pivotally mounted on the knife edge studs 15 extended through the knife edge bearings 15' thereof, which studs project laterally from a bracket 16 secured to the standard 1 by means of the set screws 16',—Figs. 1, 6 and 7 of the drawings.

By the employment of the knife edge bearings for the swinging weight beam and for the frame 7 friction is reduced to a minimum and the beam rendered more sensitive than it otherwise would be, and for the purpose of preventing the pivoted frame 7 from swinging or tilting on its bearings relative to the outer ends of the arms 13, the same is connected by a depending link 17 to a forwardly projected arm 17' pivoted to the standard 1,—Fig. 1 of the drawings.

Figures 6, 7:
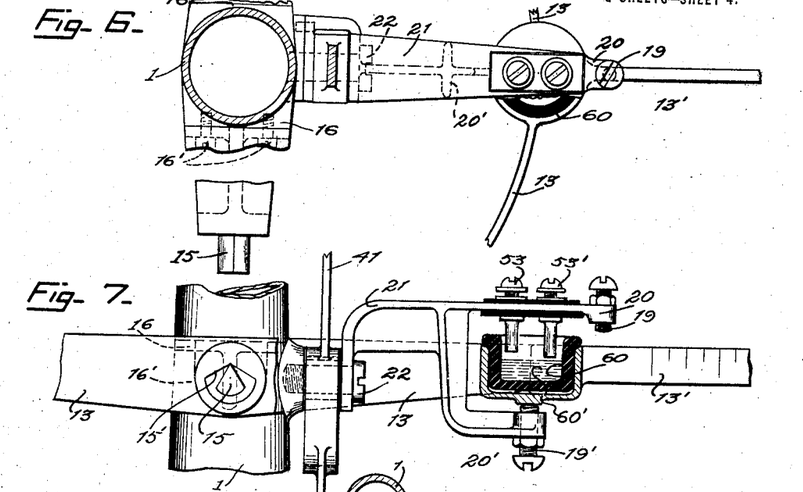
Fig. 6 is a cross sectional plan view taken on line *x—x* Fig. 1 of the drawings, viewed in the direction of the arrows.
Fig. 7 is a part sectional side elevation of the features disclosed by Fig. 6 of the drawings.

On the weight beam 13' is slidably mounted the adjustable weight 19, and for the purpose of limiting the upward and downward movements of the weight beam and holding the same in horizontal position when lowered, the said beam works between the set screws 19 and 19' carried respectively by the arms 20 and 20' projecting from a rearwardly extended bracket 21, attached to the bracket 16 by means of the screw stud 22,—Figs. 1 and 7 of the drawings.

Figure 10:
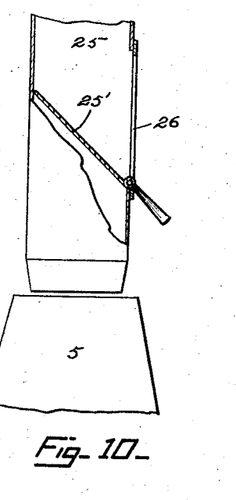
Fig. 10 is a detail part sectional view of the chute for delivering material into the feed hopper.

Within the feed hopper the inclined parallel spaced riddles 23 and 23' are mounted, the said riddles depending from the rock shafts 24 and 24' extended through the walls 5 and 5' of the hopper adjacent the upper edges thereof, and the said riddles form and constitute within the fixed hopper deflecting means for alternately diverting, guiding or directing the stream flow of material passing through the hopper to the outlets 8 and 8' thereof. The material to be weighed and passed into the cartons or containers is delivered from any suitable source of supply through the feed chute 25 and by said chute discharged into the hopper between the inclined swinging riddles 23 and 23', being guided by said riddles into one of the discharge openings in the bottom or base of the hopper leading to the discharge nozzles 9 and 9', onto which the cartons or containers to be filled are held. In the present case, the said feed chute 25 is provided with a hinged deflector section 25' which deflector when thrown inwardly diverts the flow of the material to the outside of said chute and prevents the same from flowing into the feed hopper—Fig. 10 of the drawings. This hinged section 25' normally stands in a vertical position to close the outlet 26 in the wall of the feed chute 25, only being thrown inwardly to open said outlet 26 when, for any reason, it is desired to stop the flow of the material into the feed hopper.

The rock-shafts 24 and 24' project rearwardly a distance beyond the hopper wall 5—Fig. 1 of the drawings, and are connected to work in unison by means of the transversely disposed link 27, which connects the crank arms 28 and 28' secured to and depending respectively from the said shafts 24 and 24', Fig. 3 of the drawings. To the said rock shafts there are also connected respectively the outwardly projected crank arms 29 and 29', and over a stud 30 projecting rearwardly from each of said arms works the slotted section 30' of the downwardly extended trip rods 31 and 32. These rods at their lower ends are connected respectively to the oppositely moving ratchets 33 and 33', which ratchets are pivoted to the studs 34 and 34' projecting from the supporting standard 1. These ratchets engage respectively with the spring held pawls 35 and 35' pivoted to the rotatable disks 36 and 36' held to the hopper wall 5 and they engage with the studs 37 and 37' projecting from the face of said disks. By means of the links 38 the disk 36 is connected to the spring held crank arms 39 secured to the transverse shafts $a$ carrying the dogs 10 and 10', while the disk 36' is connected in a similar manner by the links 38' to the spring held crank arms 39' secured to the transverse shafts $b$ carrying the dogs 11 and 12,—Figs. 1 and 3 of the drawings. The transverse shafts $a$ and $b$ work in brackets $a'$ secured to and projecting from the frame 7.

The connection between the trip rods 31 and 32 is such that as the trip rod 31 is moved downwardly, the opposing trip rod 32 moves upwardly, the downward movement or throw of the trip rod 31 causing the ratchet 33 to engage with the pawl 35 and by reason of its bearing on the stud or projection 37 imparting a part rotation to the disk 36, which movement of the said disk is continued until the ratchet 33 is moved from off the pawl 35, when the tension of the springs 40 acting against the crank arms 39 returns the disk 36 to normal position through the medium of the links 38—Figs. 1, 3 and 4 of the drawings. However, during the downward movement of the disk 36, the links 38 being thrown outwardly operate the spring held crank arms 39 to throw the shafts *a* to raise the dogs 10 and 10′ so as to release the filled carton or container held thereby on the discharge nozzle 9, thus allowing of the same moving onto the platform 2. During the downward movement of the trip rod 31, the opposing trip rod 32 is moved upwardly, the ratchet 33′ carried thereby raising the pawl 35′ and passing above the same. With this movement of the trip rod 32, the same is brought into position for lowering to actuate the dogs 11 and 12 as the trip lever 31 is raised. During the lowering movement of the trip rod 32, the ratchet 33′ acting against the pawl 35′ engaging with the stud 37′ imparts a part rotation of the disk 35′ until the connection between the ratchet 33′ and pawl 35′ is broken. During such movement of the disk 35′ the links 38′ are moved outwardly so as to throw the crank arm 39′ and rotate the shafts *b* to raise the dogs 11 and 12 to release the carton or container held thereby on the discharge nozzle 9′. The moment the connection between the ratchet 33′ and the pawl 35′ is broken, springs coiled on the shafts *b* acting against the crank arms 39′ (in the same manner as the coiled springs 40 act against the crank arms 39) return the disk 36′ to normal position through the medium of the links 38′ and operating the shafts *b* to throw the dogs 11 and 12 against the discharge nozzle 9′. It will be understood that the pawls 35 and 35′ are maintained normally against the studs 37 and 37′ by the action of the springs 40′, secured to the disks 36 and 36′ and bearing on the said pawls.

Figure 8:
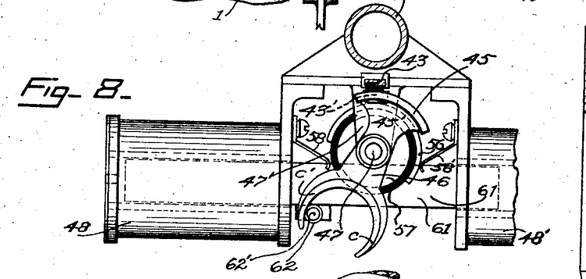
Fig. 8 is a plan sectional view taken on line *y—y* Fig. 1 of the drawings, and viewed in the direction of the arrows, illustrating the device actuated by the solenoid of the electro-magnet for shifting the position of the deflecting riddles within the feed hopper with respect to the discharge outlets thereof.
Figure 9:
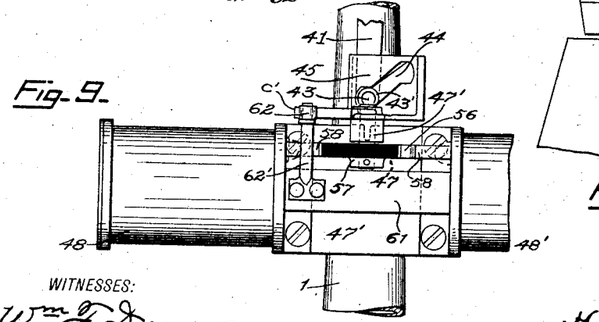
Fig. 9 is a rear elevation of the means disclosed by Fig. 8 of the drawings.

The trip rods and the features associated therewith are thrown into action at proper moments during the operation of the machine by action of suitable means, which in the present case partake of the form of an electromagnet, which controls the movement of a vertically disposed movable lever 41 connected at its upper end by a link 42 to a crank arm 42′ secured to and depending from the inner end of the rock-shaft 24—Fig. 1 of the drawings. This vertically movable lever 41 is pivoted on the projecting end of the screw stud 22—Fig. 7 of the drawings, which attaches the bracket 21 to the standard 1, and at its lower end said lever carries on a projecting stud 43 a roll 43′. The roll 43′ works within an upwardly inclined irregular groove or slot 44 cut in the vertical flange 45 of the tail extension 45′ of a horizontally disposed yoke plate 46, which plate is keyed to a vertical shaft 47 upwardly projecting from a bracket 47′ secured in any suitable manner to the standard 1,—Figs. 1, 8 and 9 of the drawings.

Figure 11:
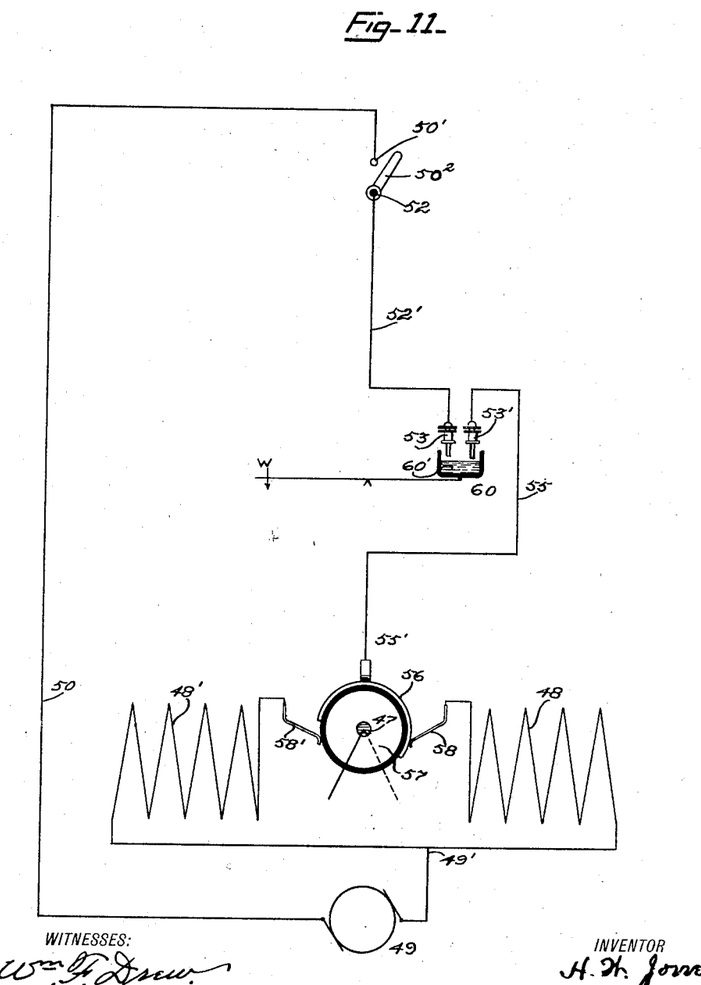
Fig. 11 is a diagrammatic view illustrating the electrical circuits for the electro-magnet.

The bracket 47′ has secured thereto a base for an electro-magnet 48 and 48′, which are connected to any suitable source of supply, as, for instance, a generator or battery 49, by means of the current wire 49′—Fig. 11 of the drawings. From the battery 49 extends a current wire 50, which connects with a binding post 50′ of a switch box 51 located at any convenient point within reach of the operator of the machine, the same in the present case being carried by the hollow standard 1, and the circuit closed by a switch lever 50²—Figs. 1 and 11 of the drawings. From the opposing binding post 52 of the switch box 51 is extended a connection or circuit wire 52′, which leads to a contact 53. This contact together with the contact 53′ is carried by the arm 20 of the bracket 21—Figs. 1 and 7 of the drawings. These contacts are insulated from the arm 20 by layers 54 and 54′ of insulating material. From the contact 53′ is extended the connection or circuit wire 55 which connects with a brush 55′ in contact normally with a segmental contact 56 secured to the insulated face 56′ of a rotatable disk 57 keyed to the shaft 47 carrying the yoke plate 46, the said brush 56 making and breaking contact alternately with the brushes 58 and 58′ connected respectively with the magnets 48 and 48′. The circuit between the battery 49 and the binding posts 50′ and 52 is closed by the switch lever 59 of the switch box 51.

The weight beam 13′—Figs. 1, 7 and 11, carries an insulated cup 60, in which is contained a body 60′ of quicksilver. When the inner end of the scale beam is raised by a lowering of its outer end, the contacts 53 and 53′ move into the body 60′ of quicksilver and closes the circuit leading to the electro-magnet, energizing the magnet with the brush of which the segmental contact 56 makes contact and drawing the solenoid 61 therein. It will be understood that any suitable form of a contact may be substituted for the body 60′ of quicksilver carried by the weight beam 13′ for closing the circuit to the electro-magnet, assuming the said solenoid to be moving in the direction of the magnet 48′, due to the brush 56 being in contact with brush 58′ and the electrical circuit closed, the same as it approaches the limit of its said movement will, by reason of a roll 62 secured to a bracket 62′ upwardly projecting therefrom engaging with the arm *c* of the yoke plate 46′, swing the said plate in such direction. On an opposite movement being imparted to the solenoid, the roll 62 will engage with the arm *c*′ of the yoke plate 46′ and swing the same in an opposite direction—Fig. 8 of the drawings. During this movement of the said yoke plate the disk 57 turning therewith carries the segmental contact 56 out of contact with the brush 58' and into contact with the brush 58, thus energizing the magnet 48. With either movement of the yoke plate 46' the roll 43 of the swinging lever 41 rides within the incline section 44 of the flanged portion 45 of the tail extension 45' of the said plate and shifts the position of the said swinging lever to actuate the rock shaft 24 of the feed hopper and through its connection the rock shaft 24' to throw the riddles 23 and 23' to shift the stream flow of material delivered into the hopper and by so doing diverting the flow of material from one discharge outlet to the opposing discharge outlet of the hopper. With this action of the said rock-shafts, the trip levers 31 and 32 are thrown as before described for actuating the associated devices controlling the movements of the dogs 10—10' and 11—12.

Preferably, the rear and front walls of the discharge nozzles 9 and 9' are slightly curved—Fig. 5 of the drawings, in order to outwardly bulge the carton or container slipped thereon, and as an aid to properly placing or positioning the cartons or containers onto the discharge nozzles, each nozzle has associated therewith a pair of spring guides 63.

Briefly stated, the operation of the improved weighing and filling machine is as follows: An operator places cartons or containers onto the discharge nozzles 9 and 9' by forcing the same thereon, where they are held by the tension of the dogs 10 and 10' and 11—12 beneath which the upper edge of the cartons or containers move by the dogs given to the upward pressure exerted thereon. The weight or counter-balance 18 having previously been properly adjusted on the weight beam 13' for a given weight of material to be delivered into the carton or container, and the switch lever 59 thrown to close the contacts 50' and 52, the stream of material is permitted to flow from the chute 25 into the feed hopper, being directed by the inclined swinging riddles 23 and 23' therein to one of the discharge outlets 8 and 8'. Assuming the same being directed to outlet 8, the same flows through the discharge nozzle 9 associated therewith into the carton or container held thereon. As the material flows into the held carton or container the weight thereof gradually causes a lowering of the frame 7 and the outer end of the pivoted weight beam 13', thus gradually raising the inner end thereof until the material flowing into the carton or container not only properly fills the same but the weight thereof balances the adjusted beam weight 13'. By this time the rear or inner end of the weight beam will have been raised sufficiently to place the contacts 53 and 53' into the body of quicksilver 60', thus completing the electrical circuit and energizing the magnet 48, which draws therein the solenoid 61. During this movement of the solenoid the roll 62 carried thereby engages with the arm c of the yoke plate 46, throwing the tail extension thereof in an opposite direction to the path of the solenoid's movement, causing the roll 43' of the swinging lever 41 to upwardly travel within the inclined slot 44 of the flanged portion 45 of the tail extension 45' of the yoke plate. This travel of the roll 43' swings the lever 41 to actuate the rock shaft 24 and through its connections the rock shaft 24' to raise the trip rod 31 and lower the trip rod 32. During this action of the said trip rods the riddles 23 and 23' are thrown to direct the stream flow to the discharge nozzle 9' and the disk 36 is part rotated through the medium of the ratchet and pawl 33 and 35 to operate the links 38 for raising the dogs 10 and 10' to release the filled carton or container, when the same, due to the weight of its contents, slips from off the discharge nozzle 9 onto the platform 2. By this time the segmental contact 56 will have been shifted to break contact with the brush 58' of magnet 48' and make contact with the brush 58 of the magnet 48. However, as the weight of the filled carton or container has been removed from the discharge nozzle 9, the adjustable weight 13' causes the downward movement of the inner end of the pivoted weight beam 13 and carrying the body of quicksilver 60 away from the contacts 53 and 53' destroys or opens the electrical circuit to the electromagnet. The operator then places an unfilled or empty carton or container onto the discharge nozzle 9 to receive the stream flow of material shifted by the riddles 23 and 23' from the discharge outlet 8 to the discharge outlet 8' on the carton or container held onto discharge nozzle 9 being filled with the proper weight of material, the operation of the associated working parts of the machine during the filling of a carton or container held to discharge outlet 9' being the same as that just described in connection with the filling of a carton or container suspended from discharge nozzle 9. The electrical circuit for shifting the solenoid of the electro-magnet with respect to the magnets thereof is thus held open until a carton or container has received therein the proper weight of material to be packed, when the electrical circuit is automatically closed by the movement of the weight beam and the mechanism for shifting the stream flow of material into an empty carton and releasing the filled carton is thrown into action, the electrical circuit being again opened on the release of the filled carton or container.

The described machine is accurate as to the filling of the cartons with the proper weight of material to be packed therein, and economical in the operation thereof, inasmuch as only a single operator is required for placing empty cartons onto the discharge nozzles of the vertically movable bottom of the feed hopper and removing the filled cartons released therefrom.

I am well aware that changes may be made in the details of construction of the various described associated working parts without creating a departure from the scope of the invention, and I do not wish to be understood as confining or restricting the said invention to such details of construction, but on the contrary wish to be understood as claiming the invention as broadly as the state of the art will permit.

Having thus fully described my invention what I claim as new and desire to protect by Letters Patent is:—

1. In an apparatus for the described purpose, the combination with a supporting structure, of a weight beam pivoted thereto, a stationary feed hopper secured to the supporting frame, a frame carried by the weight beam and positioned beneath the hopper and provided with a plurality of nozzled outlets for the reception of cartons to be filled and movable vertically relative to the feed hopper, a pair of riddles pivotally mounted at their upper ends within the said hopper for movement in unison alternately diverting the stream flow of material passing therethrough relative to the outlets of the frame, and means thrown into action by the movement of the weight beam on a given quantity of material flowing into a carton for shifting the position of the riddles within the hopper relative to the discharge outlets thereof.

2. In an apparatus for the described purpose, the combination with a feed hopper, a plurality of nozzled discharge outlets associated with the hopper for the reception of containers to be filled, clamping devices associated with said nozzles for holding containers thereto, means within the holder for alternately diverting the stream flow of material relative to the discharge outlets, weighing mechanism for the material to be delivered into the containers, and devices thrown into action by the movement of the weighing mechanism for actuating said means for diverting the flow of material on a container being supplied with a given weight of material to the outlet for a container to be filled and releasing the filled container from the discharge nozzle to which it is held.

3. In an apparatus for the described purpose, the combination with a feed hopper, a plurality of nozzled discharge outlets associated therewith for the reception of containers to be filled, riddles pivoted within the feed hopper and held in spaced relation for guiding material alternately relative to the discharge outlets, weight controlled mechanism, and means thrown into action by the movement of said mechanism for shifting the position of the pivoted riddles relative to the discharge outlets on a container receiving therein a given weight of material.

4. In an apparatus for the described purpose, the combination with the weighing mechanism thereof, of a feed hopper, a movable frame beneath the hopper carried by the weighing mechanism and provided with a plurality of nozzled discharge outlets, clamping means associated with the said frame for securing to the nozzles thereof containers to be filled, diverting means within the hopper for alternately shifting the stream of material relative to the discharge outlets, and devices thrown into action by the movement of the weighing mechanism for actuating said diverting means on a container receiving a given weight of material and throwing the clamping means to release the filled container.

5. In an apparatus for the described purpose, the combination with a feed hopper, means associated therewith and provided with a plurality of nozzled discharge outlets, shiftable means in said hopper for alternating the flow of material with respect to said outlets, weighing mechanism, clamping means for securing containers to be filled onto the nozzled outlets, electrical control means, and associated devices operable by the electrical means for actuating the shiftable means within the hopper for diverting the stream flow relative to the discharge outlets on a container receiving a given weight of material and releasing the clamping means for such container.

6. In an apparatus for the described purpose, the combination with a feed hopper, means associated therewith and provided with a plurality of discharge outlet nozzles, devices associated with each of said nozzles for clamping cartons to be filled thereto, of weighing mechanism, means within the hopper for alternately varying the flow of material relative to the discharge outlet nozzles, devices for actuating said means on a container receiving a given weight of material and actuating the clamping devices to release the said container, and a support arranged a given distance below the outlet nozzles for receiving the filled cartons released from the said outlet nozzles.

7. In an apparatus for the described purpose, the combination with the weighing mechanism thereof, of a feed hopper, a movable frame carried beneath the hopper by the weighing mechanism and provided with a plurality of nozzled discharge outlets, clamping means associated with the said frame for securing to the nozzles thereof containers to be filled, diverting means within the hopper for alternately shifting the stream of material relative to the discharge outlets, devices thrown into action by the movement of the weighing mechanism for actuating said diverting means on a container receiving a given weight of material and throwing the clamping means to release the filled container, and a support arranged a given distance below the outlet nozzles for receiving the filled cartons released from the said outlet nozzles.

In testimony whereof I have signed my name to this specification in the presence of two subscribing witnesses.

HARRY W. JONES.

Witnesses:
N. A. ACKER,
D. B. RICHARDS.

Copies of this patent may be obtained for five cents each, by addressing the "Commissioner of Patents, Washington, D. C."